Dec. 4, 1951 W. C. ANDERSON 2,577,499
PULSE MEASURING DEVICE
Filed July 9, 1945 2 SHEETS—SHEET 1

INVENTOR.
WILMER C. ANDERSON
BY
William D. Hall,
ATTORNEY

Dec. 4, 1951 W. C. ANDERSON 2,577,499
PULSE MEASURING DEVICE
Filed July 9, 1945 2 SHEETS—SHEET 2

*INVENTOR.*
WILMER C. ANDERSON
BY
William D. Hall
ATTORNEY

Patented Dec. 4, 1951

2,577,499

UNITED STATES PATENT OFFICE 2,577,499

PULSE MEASURING DEVICE

Wilmer C. Anderson, Douglaston, N. Y., assignor to the United States of America as represented by the Secretary of War Application July 9, 1945, Serial No. 604,067

7 Claims. (Cl. 250—27)

This invention relates to electrical apparatus and more particularly to apparatus for storing a brief pulse or pulse sequence so that its amplitude may be measured by conventional means.

According to conventional practice, a capacitor in series with a diode may be charged through an amplifier which is controlled by the pulse or pulses to be measured. The capacitor will retain its charge due to the unilateral character of the diode, and measurement may, therefore, be made across the capacitor. It has also been found that a cascade arrangement of such devices may be employed to increase the pulse-storing property of the apparatus. Certain shortcomings have been encountered heretofore in such pulse storage devices. For instance, due to the manner in which the diode was connected into the circuit, the cathode and filament could not be maintained at the same potential, and, therefore, leakage of the associated capacitor resulted from cathode to filament. The capacitor charge was also affected by grid current drawn by the succeeding stage. Furthermore, such systems were of necessity limited to the storage of pulses of a fixed polarity. Another disadvantage consisted in that the capacitor was not effectively isolated from the power-supply source.

It is the object of the present invention to provide circuits whereby the shortcomings in the arrangements proposed heretofore are overcome; and specifically to provide a storage system which responds to unidirectional pulses of either polarity, and which improves the ability of the storage units to retain the charge.

According to the present invention, the storage capacitors are connected in series with thermionic diode rectifiers having the anode rather than the cathode connected to a capacitor terminal. Cathode-followers or other amplifier tubes are connected in pairs so that their quiescent or bias voltages are balanced out with respect to an indicator and to a capacitor-rectifier unit connected from cathode to cathode of the paired tubes. The stored voltage is, therefore, a measure of the impressed voltage independent of the quiescent voltages. Arrangements are also provided whereby the capacitor charge when impressed on succeeding stages of the storage apparatus will be better retained through connection of the rectifier anode and capacitor junction with a driven grid.

For a better understanding of the invention, reference is made to the following detailed description and to the drawings, in which.

Figure 1:
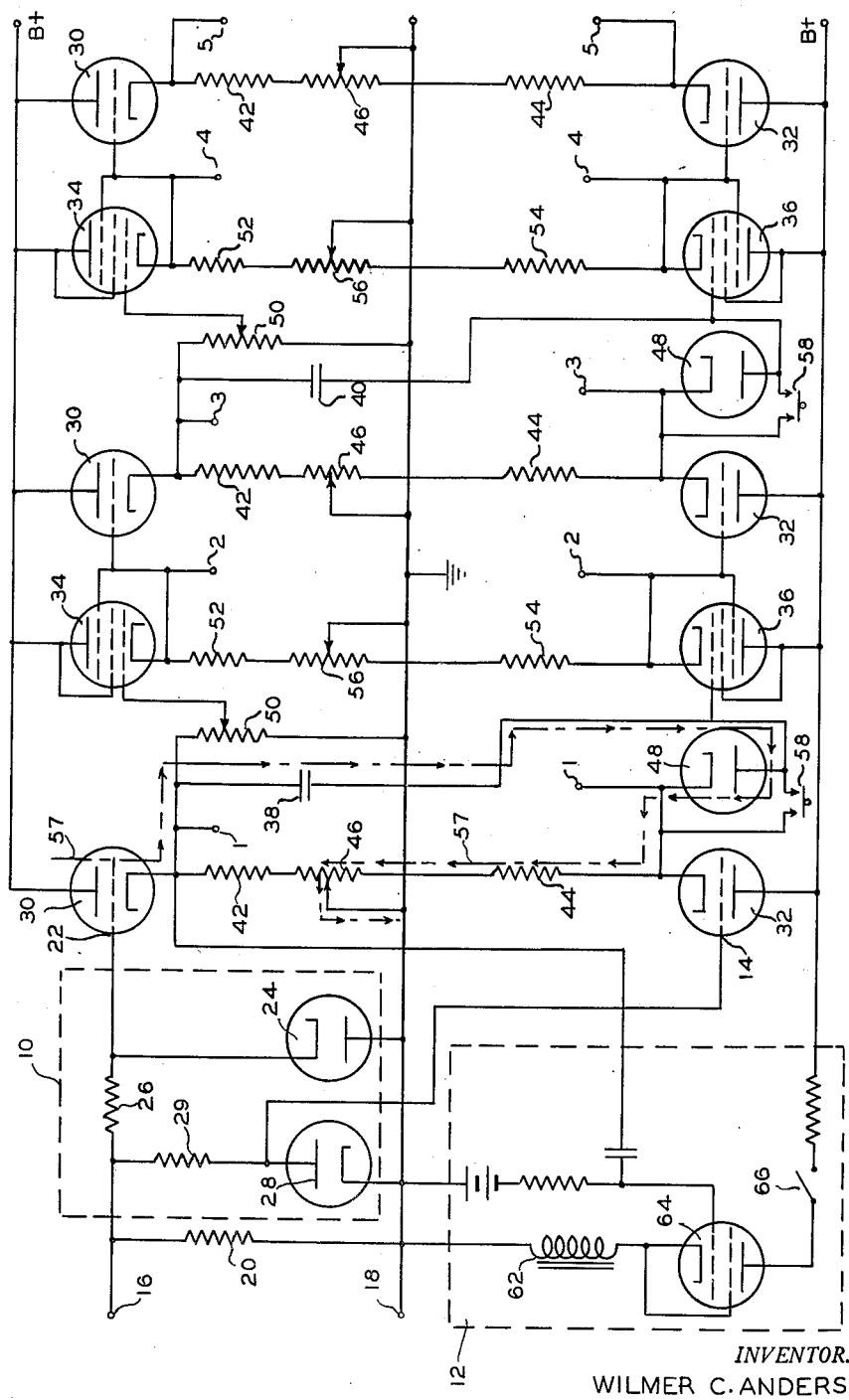
Fig 1 is a wiring diagram of a preferred embodiment of the invention.

Referring now particularly to Fig. 1, the circuit diagram, exclusive of the dotted rectangles 10 and 12, consists of two main parts. That part of the circuit above the ground or center line constitutes a cascaded current amplifier for positive input pulses to charge the capacitors during the pulses and to yield an indication on an oscilloscope or the like during those pulses. That part below the ground or center line constitutes a cascaded current amplifier for negative input pulses to charge the capacitors during such pulses. For pulses of either polarity, the part of the circuit below the center line continues the charging of capacitors in stages succeeding the first in the cascade and provides a sustained voltage differential for the indicator or other desired device operative from such sustained output.

The portion of the circuit indicated by the dotted rectangle 10 is provided so that pulses of either positive or negative potential may be applied to the input terminals 16 and 18 without reversing connections. Dotted rectangle 12 represents an accessory which furnishes a signal indicating whether positive or negative signals are being received at input terminal 16, relative to terminal 18. The apparatus of Fig. 1 yields an output voltage of fixed polarity regardless of the polarity of the input pulses.

The output signal from a discriminator or other source, optionally loaded by resistor 20, is applied through input terminals 16 and 18 and network 10 to grids 14 and 22 of a pair of triodes 32 and 30. Depending on the polarity of the input, either grid 14 or grid 22 will automatically control the input stage. Within rectangle 10 are a pair of rectifiers 24 and 28, which may be incorporated in a duplex diode. With a negative input at terminal 16, grid 22 is effectively shunted to ground by rectifier 24. Resistor 26 prevents an actual short-circuit of the input to ground, and makes the input voltage actually applied to grid 22 negligible during a negative pulse. A substantially constant-voltage source is here assumed, so that the input voltage will be sustained notwithstanding the current drawn by a load such as the conductive rectifier. For positive signals, grid 14 becomes short-circuited to ground through rectifier 28, resistor 29 preventing actual short-circuit of the input signal. In this manner polarity discrimination is provided. With positive input pulses, rectifier 24 is not conductive and the input voltage is applied to grid 22 with no appreciable loss in voltage through resistor 26. Likewise, grid 14 has its full input from terminal 16 when negative pulses are applied, rectifier 28 being nonconductive under these circumstances.

The remainder of Fig. 1 constitutes a cascade of capacitor-charging and buffer stages. Tubes 30 and 32 are shown as triodes, but other types of tubes, preferably having high transconductance for best results, may be used. Tubes 34 and 36 are embodied in stages affording high-input impedance. It will be noted that there are shown three each of the tubes 30 and 32 and two each of the tubes 34 and 36, although this number may be increased or decreased depending upon the number of stages required.

Between the cathodes of the first tubes 30 and 32, there are connected a capacitor 38 and its associated rectifier 48. Likewise, between the cathode of the second tubes 30 and 32 there are connected a capacitor 40 and its associated diode 48. The capacitor 40 will in general be larger than capacitor 38. Each capacitor, as 38 and 40, is connected between the cathode of the associated tube 30 and the anode of its rectifier 48, the cathode of which is in turn connected to the cathode of associated tube 32. The anodes of rectifiers 48 are connected to the control grids of tubes 36 in the next succeeding stages, while the control grids of tubes 34 are connected to the opposite ends of capacitors as 38 and 40, through gain controls 50. Additional storage units would be added if the cascade were continued. A voltmeter may be connected either across or in substitution for each such capacitor. Also, between the cathodes of tubes 30 and 32 in the first stage there are connected resistors 42, 44 and 46, thereby affording a cathode follower arrangement. The sliding tap of resistor 46 is grounded. This adjustability is for the purpose of balancing the voltage drops to ground from the respective cathodes of tubes 30 and 32. Tubes 34 and 36 are similarly connected as cathode followers by means of the cathode resistors 52, 54 and 56. Push buttons 58 are provided for discharging capacitors as 38 and 40 after measurement of any given pulse, pulse sequence or sustained signal in preparation for the next measurement.

In one condition of operation, it may be assumed that a positive pulse is being received. The current through tube 30 in the first stage instantaneously increases and this increases the voltage across its resistor 42 and a section of resistor 46. The plate current of the first tube 32 does not change appreciably. During the period of each pulse, capacitor 38 is caused to charge through the plate resistance of tube 30, rectifier 48, resistor 44 and the remaining portion of resistor 46. This path has been indicated by the line 57 and the direction of charging indicated by the arrows. The resultant charge on the capacitor 38 is such that a negative voltage is applied to the anode of rectifier 48 and to the control grid of tube 36. Thus, at the end of the pulse, when grid 22 is allowed to resume ground potential, the cathode of tube 30 is also returned to normal while the voltage across capacitor 38 is balanced by the inverse voltage across diode 48.

During the period of the positive pulse under consideration, the charging voltage increment plus the static voltages which already existed are applied to gain control resistor 50, and through it to the control grid of tube 34. When the pulse disappears, the control grid of tube 34 promptly returns to its normal static value. The control grid of the first tube 36, which initially was at the potential of the cathodes of tubes 30 and 32, has the negative voltage of capacitor 38 applied to it. It will be noted that whereas the incremental voltage was applied to tube 34 only during the pulse, it is applied to tube 36 both during and between pulses. Tubes 34 and 36 act as cathode followers to drive the succeeding tubes 30 and 32.

If a cathode-ray oscilloscope is connected between the terminals 1—1, that is to say, across the resistors 42, 44 and 46 of the first stage, or between any cathode and ground of the following stages, and a series of flat-peaked positive pulses is applied to terminal 16, then there would be a deflection of the electron beam in one direction from neutral during actual input to grid 22, while there would be no deflection between input pulses. Through the arrangement described, a distinction is obtained between continuous and intermittent signals. For negative input pulses, the effect can be obtained only at terminals 1—1 or between the cathode of the first tube 32 and ground.

It will be noted that each diode 48 has its cathode connected through bias resistors 44 and 46 to ground and also connected to the cathode of a tube 32. The anode of each diode 48 is connected to a capacitor as 38 or 40. In this way the charge on the capacitor is not affected by cathode-to-heater leakage of the diode; thus making possible the prolonged retention of its charge by any of the capacitors as 38 and 40.

Figure 4:
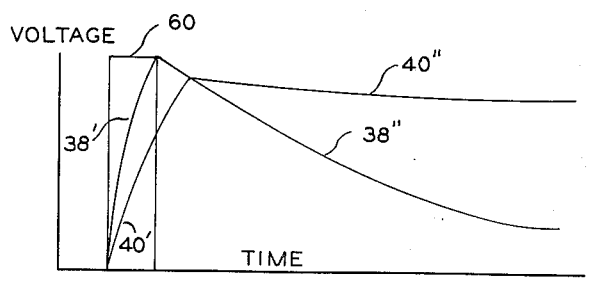
Fig. 4 is a voltage diagram related to Fig. 1.

The second stage of tubes 30 and 32, as well as the third stage, operates much the same as the first. The control grids of tubes 30 all function concurrently during a direct drive from input terminals 16 and 18. Between such pulses, control grid 14 is not driven, but the control grids of the other tubes 32 and hence 36 are driven by the voltages built up in capacitors 38 and 40. This is demonstrated in Fig. 4, wherein square-wave input pulse 60 causes small capacitor 38 (50 to 100 mmfd. for example) to charge according to curve 38' followed by discharge curve 38'', causing larger capacitor 40 (.03 mfd. in the same example) to charge according to curve 40' followed by discharge 40'', thereby providing a substantially constant voltage response at terminals 5—5. Since this output voltage is from a cathode-follower stage, ample drive for an instrument may be obtained without loading the capacitors or the source of the pulses.

During an actual pulse, the current of the final tube 30 changes from normal, while that of the final tube 32 does not. Between pulses, the current in the final tube 32 changes substantially an equal extent but oppositely. The result is to impress a more or less constant unidirectional pulse across terminals 5—5.

Capacitor 38 takes time to charge depending upon not only the plate resistance of tube 30 but the duration of the applied pulse. In the event of a single pulse of known voltage, the extent of charging will be a measure of the duration of that pulse, or if the duration of the pulse is known, then the extent of charge will be a measure of the voltage. These features extend the utility of the circuit, which primarily is intended for measuring the peak voltage of pulses having sufficient duration to fully charge it.

The purpose of gain controls 50 is to equalize the voltages applied to the control grids of tubes 34 and 36 during and between pulses. A slight voltage drop attributable to each rectifier 48 tends to make the voltage applied to the grid of the succeeding tube 36 by the capacitor as 38 or 40 less than the voltage applied directly to the grid of tube 34 during a positive voltage pulse. With the gain controls at the proper setting, the direct positive pulse drive of tube 34 and the capacitor drive of tube 36 can be made equal. Gain controls 50 also will compensate for a slight decay in capacitor charge between pulses where the pulses are positive only, and recur regularly.

During negative pulses the cathodes of tubes 30 and 34 do not appreciably fluctuate in voltage with respect to ground. Therefore, the setting of gain controls 50 is of no effect in this instance. Input grid 14 causes the plate current of input tube 32 to diminish when a negative pulse is received and thus causes a change in the voltage impressed on the capacitor-rectifier circuit. This produces a voltage drop across rectifier 48 which is impressed on the grid of the following tube 36. This same voltage is maintained on the grid of tube 36 by the capacitor 38 between pulses.

While the storing circuit so far described was considered primarily for positive pulses, it is evident that it would function substantially in the same manner and with the same polarity of output if negative pulses had been impressed. The primary difference in operation is that the tubes 32 function during the negative pulses from terminals 16 and 18, as well as between negative pulses, while tubes 30 are effective only during positive pulses. The circuit within rectangle 12 is for the purpose of providing an indication as to the polarity of the pulses being measured. In order to distinguish positive from negative pulses, a relay 62 in series with a thyratron 64 is provided for operating a lamp or providing other indication or control whenever the pulses are positive. Thyratron 64 is fired by input to its control grid from the cathode of the first tube 30. Switch 66 is allowed to remain open when no polarity indication is desired.

The circuit of Fig. 1 may be simplified by omission of the portions thereof inclosed by the dotted rectangles 10 and 12, in the event it is to be used only for measuring pulses having a fixed polarity. One input grid 14 or 22 is grounded directly or through a resistor under these circumstances, depending upon the polarity of the signal to be measured.

Figure 2:
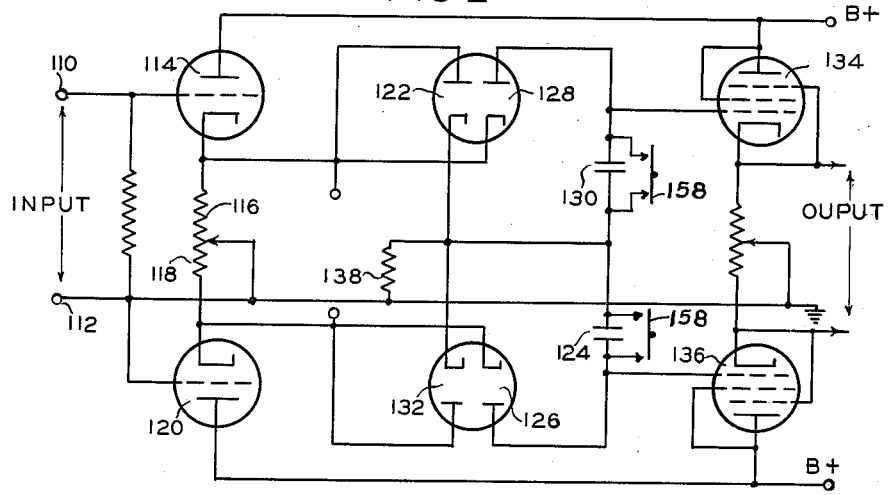
Figs. 2 and 3 are other illustrative species.

In Fig. 2, there is shown a modification of the circuit for storing and measuring unidirectional pulses. These may be either all positive or all negative for any one measurement. The input is applied at terminals 110 and 112 and is impressed on triode 114. The voltage across resistor section 116 is changed according to the change in plate current of tube 114 caused by the pulse. Since the voltage across resistor section 118 is unchanged, a difference of potential is established between the cathode of tube 114 and the cathode of tube 120. Depending on its polarity, the voltage pulse passes through diode section 122 to charge capacitor 124 through diode section 126, or through diode section 132 to charge capacitor 130 through diode section 128. Assuming a positive pulse is impressed at terminal 110 relative to 112, capacitor 124 will be charged with its negative end connected to the grid of tube 136 and its positive end connected to ground and terminal 112 through resistor 138 which is of high impedance with respect to that of rectifier 126 or 128, resistor 116 or 118, and either capacitor. The grid of tube 136 is driven from charged capacitor 124 between pulses, and from the charging voltage impressed on those capacitors during the pulse. For pulses of negative polarity, capacitor 130 will drive tube 134 in a similar manner. Only at the cathodes, i. e., terminals 1'—1', of the input stage can an oscilloscope be used to distinguish intermittent pulses from a continuous signal. Push buttons 158, identical in function to push buttons 58 in Fig. 1, are used to discharge capacitors 124 and 130 after measurement of any given pulse. A voltmeter connected from cathode to cathode of any one stage will read in one direction from zero for a positive pulse or pulses and in the opposite direction for negative pulses.

The two stages shown may be followed by similar stages in cascade if desired. The same duplex diode and capacitor arrangement shown should be used (with successively larger capacitors) in the succeeding cascaded stages. It will be noted that the primary objects of the invention are accomplished much as in the case of the species of Fig. 1.

Figure 3:
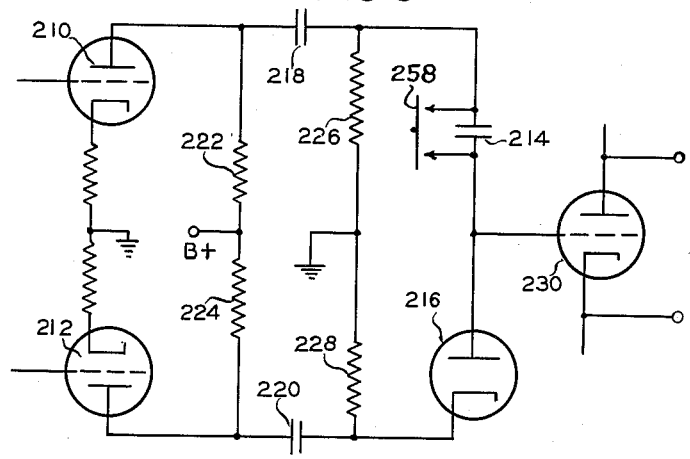

In Fig. 3, another application is shown of the broad arrangement of a diode and rectifier connected in series for storing a charge, with the cathode of the rectifier connected to ground through a direct-current path. Tubes 210 and 212 are arranged as a balanced amplifier, and the input signal is applied to the grid of one. The pulse variation output from the plate of tube 210 or 212 is rectified and impressed on capacitor 214 through diode 216 and coupling capacitors 218 and 220. Plate load resistors 222 and 224 determine the amount of voltage change for a given input signal, and resistors 226 and 228 furnish a return path whereby the charge voltage on capacitor 214 may be applied to the grid of the succeeding tube 230. Push button 258 has the same purpose as the push buttons in Figs. 1 and 2. The tube 230 may be used in any desired manner to give an indication of the charge on capacitor 214. For example, it might be used as a variable resistance to vary the current in a circuit containing a battery, a current meter and the tube. In such case the current flow would be an indication of capacitor charge. This circuit sacrifices the low impedance output of the cathode follower for charging the capacitor, but the arrangement retains certain of the advantages of the capacitor-rectifier arrangement as mentioned above.

While there have been disclosed what are at present considered the preferred embodiments of the invention, it will be apparent to those skilled in the art that various modifications can be made therein without departing from the spirit of the invention.

What is claimed is:

1. An apparatus adapted to operate in conjunction with a pulse source for measuring the amplitude of applied unidirectional pulses of positive or negative polarity, comprising a plurality of pairs of cathode follower means, balancing means connected in the output circuit of each pair of cathode follower means, respectively, for adjusting the outputs of the cathode followers of each pair to the same quiescent value, polarity discriminating means connected to the input circuit of a first pair of said cathode follower means for impressing pulses of positive polarity from the pulse source to one cathode follower of said first pair and pulses of negative polarity to the other cathode follower of said first pair, electrical energy storage means connected in the output circuit of each pair of cathode follower means, and rectifier means in series with each storage means with the anode thereof directly connected to the storage means to provide a plurality of pulse-retaining circuits each responsive to the difference in the outputs of the pair of cathode follower means preceding said pulse-retaining circuit, a plurality of pairs of amplifier means each of which has its input circuit coupled to the output circuit of the preceding cathode follower means so as to be cascaded alternately with said cathode follower means, one of each pair of amplifier means being driven by the output of the preceding cathode follower means, the other of said amplifier means being coupled to the preceding pulse-retaining circuit so as to be driven by the output thereof, the outputs of said amplifier means being applied to drive the next succeeding cathode follower means, and a plurality of second balancing means for adjusting each of the outputs of said amplifier means to the same quiescent value.

2. An apparatus adapted to be operated in conjunction with power-supply means for storing applied unidirectional pulses, comprising a balanced amplifier having an output impedance across which the quiescent voltages applied to said amplifier by said power-supply means are balanced out, a thermionic rectifier having a cathode and an anode, and a capacitor coupled at one end to a terminal of said impedance and at the other end to the anode of said rectifier, the cathode of said rectifier being coupled to the other terminal of said impedance, whereby leakage of said rectifier cathode will not act as a load on said capacitor when the latter has been charged.

3. Apparatus as claimed in claim 2, including an amplifier responsive to the voltage stored in said capacitor and having an input grid connected to the junction of said capacitor and said rectifier anode, whereby only negative potential is applied to said grid by said capacitor and said grid will not draw current to discharge said capacitor.

4. An apparatus adapted to operate in conjunction with a pulse source for measuring the amplitude of applied unidirectional pulses of positive or negative polarity, comprising a plurality of paired cascaded first and second amplifier means, a plurality of first balancing means for adjusting the outputs of each of said first and second amplifier means to the same quiescent value, polarity discriminating means for transferring pulses of positive polarity from the pulse source to the input of the first of said first amplifier means and to apply pulses of negative polarity to the input of the first of said second amplifier means, a plurality of capacitive means, a plurality of rectifier means respectively connected in series with said capacitive means across the output circuit of each of said first and second amplifier means to afford pulse-retaining circuits each responsive to the difference in the outputs of a respective pair of said first and second amplifier means, a plurality of paired third and fourth amplifier means each of which has its input circuit coupled to the output circuit of the preceding first and second amplifier means so as to be cascaded alternately between each of said first and second amplifier means, each of said third amplifier means being driven by the output of each preceding first amplifier, said fourth amplifier means being coupled to each preceding pulse-retaining circuit so as to be driven by the ouput thereof, the outputs of each third and fourth amplifier means being applied to the input of the next succeeding first and second amplifiers to effect the drive thereof, and a plurality of second balancing means for adjusting the outputs of each of said third and fourth amplifier means to the same quiescent value.

5. An apparatus adapted to operate in conjunction with a pulse source for measuring the amplitude of applied unidirectional pulses of positive or negative polarity, comprising a plurality of cascaded paired first and second cathode follower amplifier means, a plurality of first balancing means for adjusting respectively the outputs of each of said first and second amplifier means to the same quiescent value, polarity discriminating means for transferring pulses of positive polarity from the pulse source to the input of the first of said first amplifier means and to apply pulses of negative polarity to the input of the first of said second amplifier means, a plurality of storage capacitors, a plurality of rectifier means respectively connected in series with said capacitors across the output circuit of each of said first and second amplifier means to afford pulse-retaining circuits each responsive to the difference in the outputs of a pair of said first and second amplifier means, each of said capacitors in succeeding pulse-retaining networks being of progressively increasing capacity, a plurality of third and fourth amplifier means each of which has its input circuit coupled to the output circuit of the preceding first and second amplifier means so as to be cascaded alternately with said first and second amplifier means, each of said third amplifier means being driven by the outputs of said first amplifiers, each of said forth amplifier means being coupled to the preceding pulse-retaining circuits so as to be driven by the output thereof, the outputs of each of said third and fourth amplifier means driving the next succeeding first and second amplifiers, and a plurality of second balancing means for adjusting the outputs of each of said third and fourth amplifier means to the same quiescent value.

6. An apparatus adapted to operate in conjunction with a pulse source for measuring the amplitude of applied unidirectional pulses of positive or negative polarity, comprising a plurality of cascaded paired first and second cathode follower amplifier means, a plurality of first balancing means for adjusting the outputs of each of said first and second amplifier means to the same quiescent value, polarity discriminating means for transferring pulses of positive polarity from the pulse source to the first of said first amplifier means and to apply pulses of negative polarity to the first of said second amplifier means, a plurality of storage capacitors, a plurality of rectifier means respectively connected in series with said capacitors across the output circuit of each of said first and second amplifier means to afford pulse-retaining circuits each responsive to the difference in the outputs of a pair of said first and second amplifier means, each of said capacitors in succeeding pulse-retaining networks being of progressively increasing capacity, switching means to individually discharge each of said plurality of capacitors, a plurality of paired third and fourth amplifier means each of which has its input circuit coupled to the output circuit of the preceding first and second amplifier means so as to be cascaded alternately with said first and second amplifier means, each of said third amplifier means being driven by the outputs of said first amplifiers, each of said fourth amplifier means being coupled to the preceding pulse-retaining circuits so as to be driven by the outputs thereof, the outputs of each of said third and fourth amplifier means driving the next succeeding first and second amplifiers, and a plurality of second balancing means for adjusting the outputs of each of said third and fourth amplifier means to the same quiescent value.

7. An apparatus, in accordance with claim 1, wherein said polarity discriminating means for transferring pulses of positive polarity to a first amplifier means and to apply pulses of negative polarity to a second amplifier means comprises a pair of rectifiers, means for connecting one of said rectifiers across the input circuit of said first amplifier means for conduction during applied pulses of negative polarity, and means for connecting the other of said rectifiers across the input circuit of said second amplifier means for conduction during applied pulses of positive polarity.

WILMER C. ANDERSON.

REFERENCES CITED

The following references are of record in the file of this patent:

UNITED STATES PATENTS

| Number | Name | Date |
| --- | --- | --- |
| 2,113,011 | White | Apr. 5, 1938 |
| 2,294,863 | Hadfield | Sept. 1, 1942 |
| 2,348,016 | Michel | May 2, 1944 |